(12) United States Patent
Choy et al.

(10) Patent No.: US 8,254,073 B1
(45) Date of Patent: Aug. 28, 2012

(54) HIGH VOLTAGE TRANSMIT/RECEIVE SWITCH AND METHOD THEREFOR

(75) Inventors: Benedict C. K. Choy, Cupertino, CA (US); Jimes Lei, Milpitas, CA (US)

(73) Assignee: Supertex, Inc., Sunnyvale, CA (US)

( * ) Notice: Subject to any disclaimer, the term of this patent is extended or adjusted under 35 U.S.C. 154(b) by 366 days.

(21) Appl. No.: 12/643,143

(22) Filed: Dec. 21, 2009

Related U.S. Application Data

(60) Provisional application No. 61/175,848, filed on May 6, 2009.

(51) Int. Cl.
*H02H 3/20* (2006.01)
*H02H 9/04* (2006.01)

(52) U.S. Cl. .................................... 361/91.1

(58) Field of Classification Search ............... 361/91.1
See application file for complete search history.

(56) References Cited

U.S. PATENT DOCUMENTS 7,974,061 B2 * 7/2011 Morrish .............. 361/111

* cited by examiner

*Primary Examiner* — Dharti Patel
(74) *Attorney, Agent, or Firm* — Weiss & Moy, P.C.; Jeffrey D. Moy (57) ABSTRACT

A two terminal transmit receive device passes small analog signals with a constant low resistance value to the input of a low noise, low voltage receiver amplifier and can protect the input against the high voltage transmit signals in ultrasound applications without the aid of any power supplies. The device uses depletion-mode transistors that are normally on to pass small analog signal and a voltage detection circuit that quickly turns off the depletion-mode transistors when the presence of high voltage is detected.

6 Claims, 6 Drawing Sheets

Alternative Implementation of the Detection Circuit and SW Block of the Invention

Fig. 1

(Prior Art)

Fig. 2

(Prior Art)

Fig. 3

Figure 4: I-V Characteristics of the TR Switch Invention

Figure 5: Simplified Application Circuit Diagram of the Invention

Figure 6: Detailed Circuit Diagram of the Invention

Figure 7: Alternative Implementation of the Detection Circuit and SW Block of the Invention

HIGH VOLTAGE TRANSMIT/RECEIVE SWITCH AND METHOD THEREFOR

RELATED APPLICATIONS

This application claims the benefit of U.S. Provisional Application No. 61/175,848 filed May 6, 2009, which is incorporated herein by reference in their entirety.

FIELD OF THE INVENTION

The invention relates to a transmit/receive switch and, more specifically, to a transmit/receive switch used to protect a low noise low voltage receiver against high voltage transmit pulses while in transmit mode and allowing small analog signals to pass into the low noise low voltage receiver while in receive mode in an ultrasound imaging application.

BACKGROUND OF THE INVENTION

Figure 1:
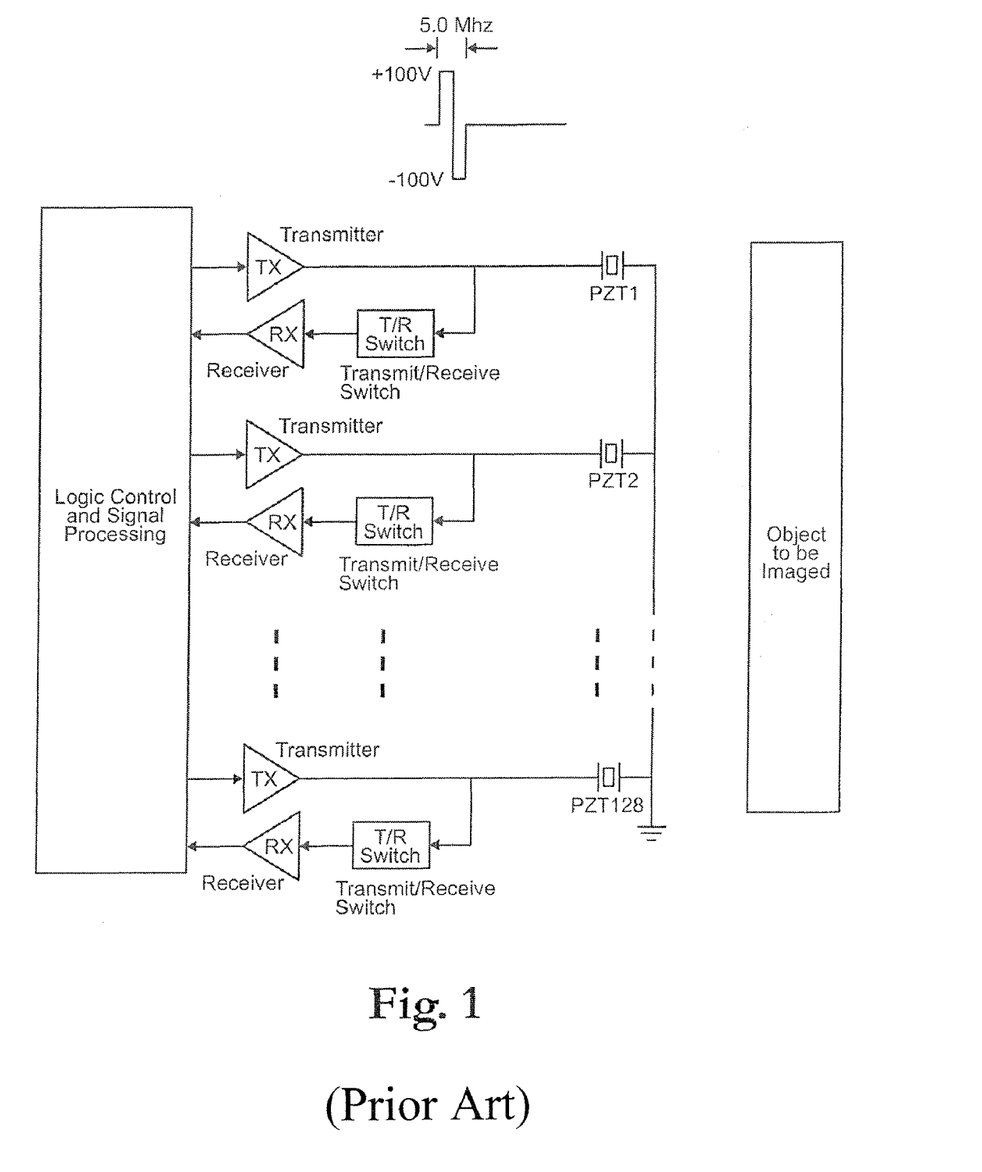
FIG. 1 is a simplified block diagram of a prior art 128 channel ultrasound imaging array.

The fundamental principle of ultrasound imaging is to use acoustic waves to help image an object. The basic blocks for ultrasound imaging is the use of an array 10 of piezoelectric transducers (T) in which each transducer will require a high voltage transmitter block (TX), a transmit/receive switch block (T/R Switch), and a low noise receiver block (RX) as shown in FIG. 1.

In each transducer (T), the transmitter (TX) sends out a ±100V 5.0 MHz pulse into the piezoelectric transducer (PZT). At the same time, the transmit/receive switch (T/R Switch) is protecting the receiver (RX) against the ±100V signal. The transmit signal causes the piezoelectric transducer (PZT) to vibrate thereby creating an acoustic wave. The acoustic wave hits the object to be imaged 12. An acoustic echo is bounced back into the transducer (T). The transducer (T) now converts the acoustic echo into an electric signal, which can be referred to as the receive signal, is normally no greater than a few 100 millivolts. The transmit/receive switch (T/R Switch) allows the small receive signal to pass into the receiver (RX). The signal from the receiver (RX) is used to help reconstruct a small part of the image. The remaining channels are used in a similar fashion to help reconstruct a complete image of the object.

Figure 2:
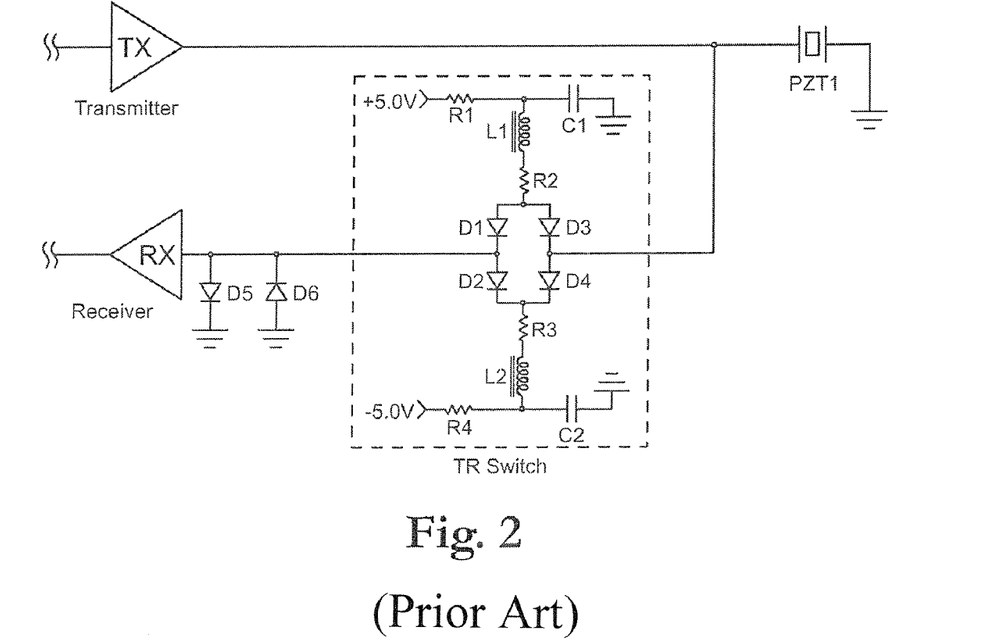
FIG. 2 is a circuit diagram of a prior art for a Transmit/Receive Switch using discrete diodes, resistors, capacitors, and inductors.

The transmit/receive switch (T/R Switch) is commonly implemented using high voltage diodes, D1, D2, D3, and D4 configured as a diode bridge and a means of biasing the diodes. This is shown in FIG. 2.

The T/R Switch must have a very fast response time in order to effectively protect the receiver (RX). This is because the transmit signal is very high in frequency and voltage. During the receive mode, the T/R Switch must not introduce any noise, distort or attenuate the receive signal going into the receiver (RX). The ±5.0V supplies along with R2 and R3 sets the bias currents for D1, D2, D3, and D4. Electrical noise on the +5.0V supply is filtered by R1 and C1 and blocked by L1. Electrical noise on the −5.0V supply is filtered by R4 and C2 and blocked by L2. L1 and L2 are also used to keep C1 and C2 from attenuating the receive signal. There is a total of 12 components for every T/R Switch.

The diodes D1, D2, D3, and D4 are constantly being biased. For a system having 128 channels or even more will create a power consumption concern. The component count also creates problems for the printed circuit board layout as it consume a lot of area and must be strategically placed to minimize electric noise. The ±5.0V power lines must be routed to all the channels which in itself are a nuisance due to the large channel count. As the demand for more channels increases, the need for an improved T/R switch is warranted.

Therefore, a need existed to provide a system and method to overcome the above problems. The system and method will provide a more compact TR switch. It should be noted that while the above Background discloses an ultrasound application, the present invention is not limited to ultrasound application. The present invention disclosed below may be used in other applications such as but not limited to: a resettable fuse, data acquisition input protection, and output short circuit protection.

SUMMARY OF THE INVENTION

A two terminal high voltage transmit and receive protection switch has a constant resistance characteristic when small signals, amplitudes within approximately −300 mV and +300 mV, are applied and a low constant current source characteristic when high voltages, amplitudes more positive than approximately +2.0V and more negative than approximately −2.0V, are applied.

A two terminal high voltage transmit and receive protection switch has depletion-mode devices. The depletion-mode devices provide a low noise constant resistance characteristic with zero biasing supplies when small signals are applied. A voltage detection circuit turns off the depletion-mode devices and causes the two terminals to have characteristics of a low value constant current source when voltages more positive than approximately 2.0V or more negative than approximately −2.0V are applied to the terminals with respect to each other.

A two terminal high voltage transmit and receive protection switch has a first high voltage N-channel depletion-mode transistor. A drain terminal of the first high voltage N-channel depletion-mode transistor is connected to a first terminal of the two terminal high voltage transmit and receive protection switch. A switch block is connected in series to the source terminal of the first high voltage N-channel depletion-mode transistor. A second high voltage N-channel depletion-mode transistor has a drain terminal connected to a second terminal of the two terminal high voltage transmit and receive protection switch. A source terminal of the second high voltage N-channel depletion-mode transistor is connected in series with the switch block.

The present invention is best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 3:
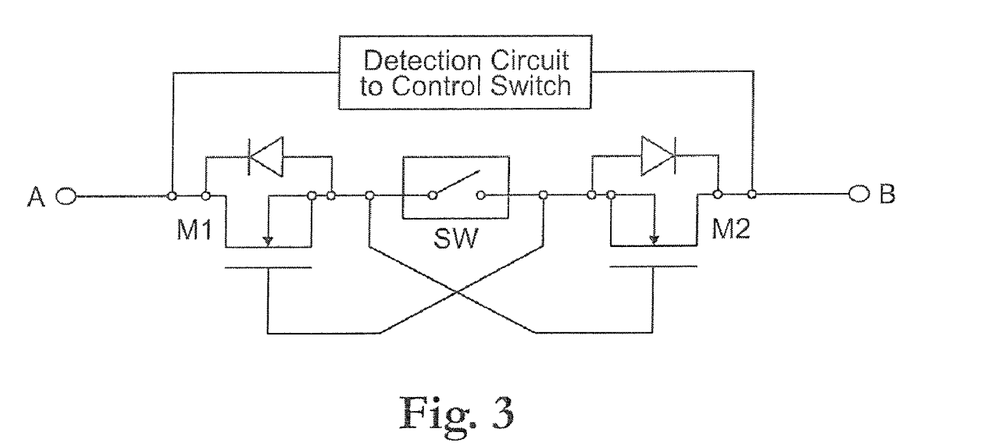
FIG. 3 is a simplified block diagram of a Transmit/Receive Switch of the present invention.

Referring to FIG. 3, one embodiment of a TR switch 100 is shown. In general, the TR Switch 100 has two modes of operation; 1) protection mode and 2) receive mode. In the protection mode, the TR Switch 100 should protect a low voltage low noise receiver amplifier against the high voltage transmit pulses. This may have to occur quickly because the transmit pulses are generally high frequency and high voltage. In the receive mode, the TR switch resistance should be fairly constant to minimize any distortion. The TR switch 100 further should minimize any parasitic capacitances to any AC ground path that would attenuate the signal, and further should minimize any electrical noise that may be introduced. The TR switch 100 should automatically switch from protection mode to receive mode with minimal external command control signals or power supplies. The TR switch 100 further should protect against both positive and negative voltages.

Figure 4:
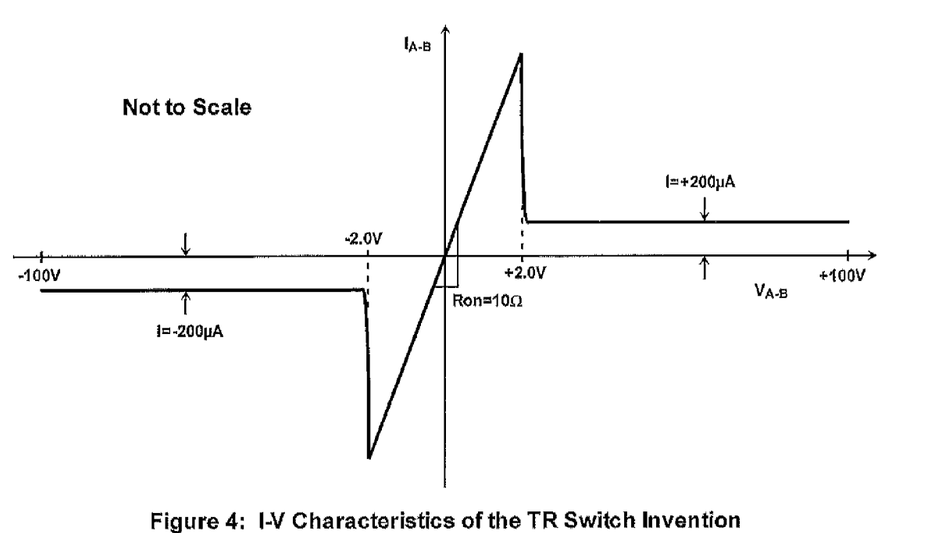
FIG. 4 is an I-V characteristics of the Transmit/Receive Switch of FIG. 3.

As shown in FIG. 3 a simplified circuit diagram of the TR switch 100 is shown. The TR switch 100 is effectively a two terminal device, terminals A and B. The TR switch 100 has transistors M1 and M2. Diodes DM1 and DM2 are parasitic diodes which are inherent to the structures of the transistors M1 and M2 respectively. A switch block SW is coupled to the transistors M1 and M2. A detection circuit block 110 is coupled to terminals A and B. FIG. 4 shows the I-V characteristics of the TR switch 100.

Referring back to FIG. 3, in accordance with one embodiment, to minimize introducing any electrical noise and to function without power supplies, depletion-mode transistors M1 and M2 can be used. M1 and M2 are high voltage depletion-mode MOSFETs. Depletion-mode transistors were specifically used because of their normally on characteristic and are inherently less noisy than their enhancement-mode counter parts. With the use of depletion-mode transistors, power is therefore not required to turn on M1 and M2. The voltage rating of M1 and M2 should be made equal to or greater than the maximum voltage the device is intended to protect against, typically ±100V.

The switch block SW may be a two terminal switch. Each terminal of the switch block SW may be coupled to the gate and source terminals of a respective Transistor M1 or M2. The switch block SW may also be a depletion-mode device. The switch block SW voltage rating is relatively lower as the switch block SW generally does not see the high voltage. The voltage rating of the switch block SW may further need to be equal to or greater than the pinch-off voltage of M1 and M2. In accordance with one embodiment, a 10V rating for the switch block SW should be sufficient.

The device structure of the switch block SW may be either a P-channel Junction Field Effect Transistor (JFET) or a P-channel depletion-mode MOSFETs. JFETs are inherently depletion-mode structures. When there is no high voltage present, the impedance from terminal A to terminal B looks like a constant resistor where the resistance value is the sum of the channels resistance of M1, SW, and M2. This allows small AC signals to pass through while high voltage signals are blocked. Practically, the sum is in the range of 10 to 30 ohms.

A detection circuit block 110 may be used to quickly turn the switch block SW off. The detection circuit block 110 monitors the voltage on terminal A and B. If the voltage is greater than a few voltages, it will start turning off the switch block SW. It uses the energy from the transmit signal to power itself and turn off SW. There are several implementations for the detection circuit block 110.

Figure 5:
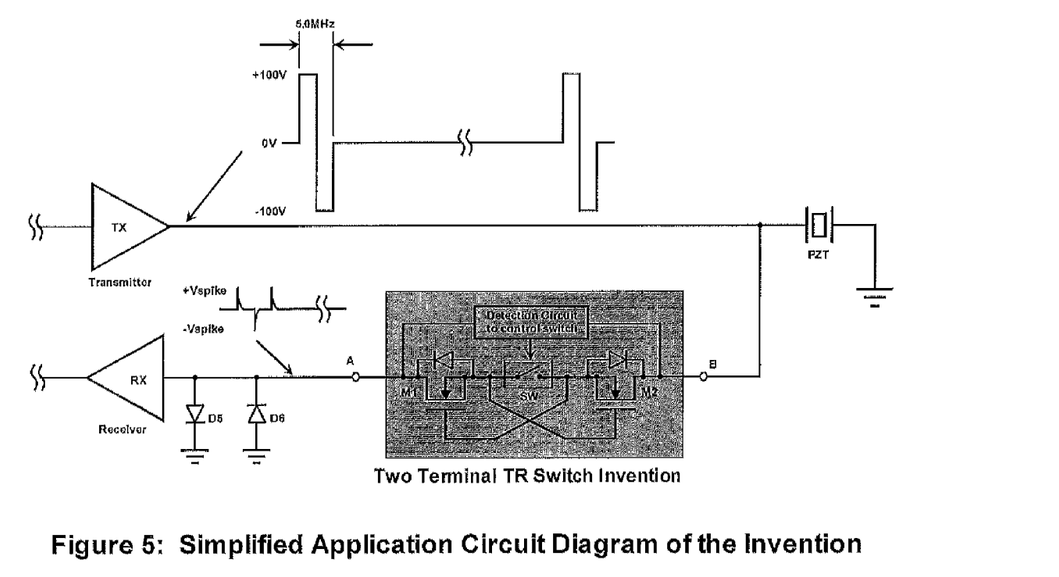
FIG. 5 is a simplified block diagram of a Transmit/Receive Switch of the present invention in a transducer of an ultrasound imaging array.

Referring to FIG. 5 one embodiment of the TR switch 100 is shown in a transducer T. In a transducer T, when the transmitter TX sends +/−100V to the piezoelectric transducer PZT, the TR switch 100 protects the receiver RX by not allowing any high voltages to damage the input of the receiver RX. During the rising and falling edges of the transmit pulses, peak currents will pass through the TR switch 100 due to two reasons. The first is some finite time is needed for the detection circuit block 110 to turn the switch SW off. The second reason is the TR switch 100 has some finite parasitic capacitance across nodes A and B. It is common practice to have back to back diodes, D5 and D6 as shown in FIG. 5, clamping the input voltages to the receiver to only +/−0.7V. The +Vspike and −Vspike are the results of the diodes shunting the peak currents to ground.

Figure 6:
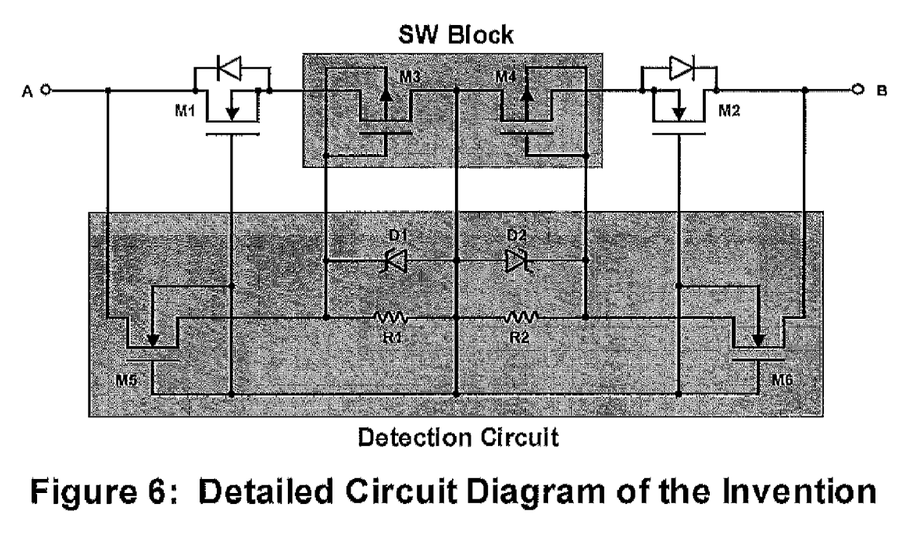
FIG. 6 is a more detailed block diagram of the Transmit/Receive Switch of the present invention.

Referring to FIG. 6, a more detailed view of the TR switch 100 is shown. In the present embodiment, details of the detection circuit block 110 and the switch block (SW) are shown.

In the present embodiment, the switch block SW has a pair of transistors M3 and M4. The transistors M3 and M4 may be low voltage depletion-mode P-channel MOSFETs with low pinch off voltage. The detection circuit block 110 consists of transistors M5 and M6, resistive elements R1 and R2, and Zener diodes D1 and D2. The transistors M5 and M6 may be high voltage depletion-mode N-channel MOSFETs. The resistive elements R1 and R2 may be used to set the biasing current. D1 and D2 are used to protect the gates of M3 and M4 respectively.

When there is no voltage applied to node B, the transistors M1, M2, M3, and M4 are all on since the transistors M1, M2, M3, and M4 are all depletion-mode transistors. The sum of the transistors M1, M2, M3, and M4 on-resistances sets the overall desired switch resistance from nodes A to B. When a positive high voltage pulse is applied to node B, transistor M6 will charge up the gate of transistor M4 turning transistor M4 off. Once transistor M4 turns off, transistor M2 will also turn off. Transistor M6 is effectively a source follower charging the gate of transistor M4 turning it off.

A Zener diode D2 may be added to protect the gate of the transistor M4 against any peak voltage that might couple in due to parasitic capacitance. It is important that the pinch-off voltage of the transistor M6 is greater than that of transistor M4 otherwise there will not be sufficient voltage to turn off transistor M4. The Zener voltage for Zener diode D2 should be sufficiently greater than the pinch-off voltage of the transistor M6 to avoid the Zener diode D2 from shunting high current from the transistor M6. Transistor M6 is sized so that the transistor M6 can charge up the gate of the transistor M4 within 20 ns or faster. This gives the TR switch 100 a fast response time to protect the receiver RX.

As may be seen in FIG. 6, the TR switch 100 is symmetrical for nodes A and node B. The symmetry can be seen between transistors M3 and M4. When a negative voltage is applied to node B, transistor M5 will charge up the gate of transistor M3 turning the transistor M3 off quickly. When transistor M3 turns off, transistor M1 will also turn off. Zener diode D1 will protect the gate of M3 against any peak voltages that might couple in due to parasitic capacitance.

Figure 7:
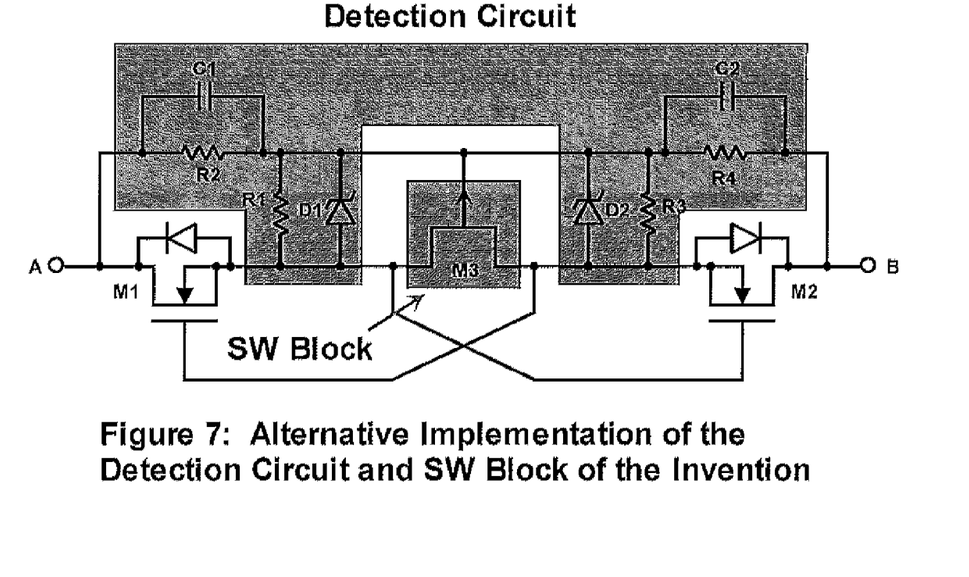
FIG. 7 is another embodiment of a detection circuit used in the present invention.

Referring to FIG. 7, another embodiment of the detection circuit block 110' and the switch block SW' is shown. The switch block SW' consists of just one device, transistor M3' which is a low voltage P-channel JFET. Transistor M3' does not have to be a JFET. It can also be a low voltage depletion-mode P-channel MOSFET. The detection circuit consists of resistive elements R1, R2, R3, and R4; Zener diodes D1 and D2, and capacitive elements C1 and C2. The operation is similar to FIG. 6.

When a high voltage pulse is applied to node A, the capacitive C1 will quickly charge the gate of the transistor M3 during the rise time of the high voltage pulse. The gate voltage will be clamp by the Zener diode D2. The zener voltage of the Zener diode D2 is set to be lower than the maximum allowable gate voltage of the transistor M3. The value of the capacitive element C1 should be larger than the gate capacitance of the transistor M3. This allows the transistor M3 to be turned off faster. When the high voltage pulse has finished rising, the only current path from node A to node B is from the resistive element R2 then the current branches into the Zener diode D2, the resistive elements R3 and R4 then connects back to node B. The value of the resistive element R2 dominates the current setting for the high voltage pulses. When there is no pulses applied to node A, the resistive elements R1 and R3 discharges the voltage on the gate of the transistor M3 turning the transistor M3 back on. The invention presented is not limited to ultrasound application, it can also be used as a resettable fuse, data acquisition input protection, and output short circuit protection. As a resettable fuse, the device can be used in series with either an AC or DC voltage source that powers up any electronic circuit very similar how a fuse would be used. When a fault occurs where excessive current is being drawn from the voltage source, the fuse will blow open eliminating the excessive current. The fuse however would have to be physically replaced after the fault has been corrected. A resettable fuse will reset itself after the fault has been corrected eliminating the need to replace the device.

For data acquisition, there are many different probes used to measure voltage, current, temperature and so forth. A low voltage probe can be inadvertently connected to a high voltage AC source thereby damaging the data acquisition instrument.

The invention presented can act as a protection device by not allowing high currents to damage the data acquisition instrument when it is inadvertently connected to high voltages. When the user notices his error and removes the probe from the high voltage source, no damage will occur and the device resets itself as if the error has never occurred.

The invention presented can also be used as a generic output short circuit protection. Consider for example the output of a discrete linear voltage regulator or the output of a discrete high current operational amplifier, the invention presented can be used in series with the outputs giving them output short circuit protection. Variations on voltage, On-resistances, and trip points will allow the invention presented to be optimized for applications other than ultrasound.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A two terminal high voltage transmit and receive protection switch comprising:
    depletion-mode devices, the depletion-mode devices providing a low noise approximately constant resistance characteristic with zero biasing supplies when small signals are applied; and
    a voltage detection circuit that turns off the depletion-mode devices and causes the two terminals to have characteristics of a low value constant current source when voltages more positive than approximately 2.0V or more negative than approximately −2.0V are applied to the terminals with respect to each other;
    wherein the depletion-mode devices comprises:
    a first high voltage N-channel depletion-mode transistor, a drain terminal of the first high voltage N-channel depletion-mode transistor connected to a first terminal of the two terminal high voltage transmit and receive protection switch, a gate terminal of the first high voltage N-channel depletion-mode transistor connected to the voltage detection circuit;
    a switch block connected to the source terminal of the first high voltage N-channel depletion-mode transistor;
    a second high voltage N-channel depletion-mode transistor, a drain terminal of the second high voltage N-channel depletion-mode transistor connected to a second terminal of the two terminal high voltage transmit and receive protection switch, a source terminal of the second high voltage N-channel depletion-mode transistor connected in series with the switch block, a gate terminal of the second high voltage N-channel depletion-mode transistor connected to the voltage detection circuit;
    wherein the switch block comprises a low voltage P-channel JFET having a source terminal connected to the source terminal of the first high voltage N-channel depletion-mode transistor, a drain terminal of the P-channel JFET connected to the source terminal of the second high voltage N-channel depletion-mode transistor, and a gate terminal of the P-channel JFET connected to the voltage detection circuit;
    wherein the gate terminal of the first high voltage N-channel depletion-mode MOSFET is connected to the source terminal of the second high voltage N-channel depletion-mode MOSFET, the gate terminal of the second high voltage N-channel depletion-mode MOSFET is connected to the source terminal of the first high voltage N-channel depletion-mode MOSFET, a voltage detection circuit comprises:
    a first Zener diode coupled to the gate and source terminals of the low voltage P-channel JFET;
    a first resistor coupled to source and gate terminals of the low voltage P-channel JFET;
    a second resistor coupled to the drain and source terminals of the first high voltage N-channel depletion-mode transistor;
    a first capacitor coupled to the drain and source terminals of the first high voltage N-channel depletion-mode transistor;
    a second Zener diode coupled to the gate and drain terminals of the low voltage P-channel JFET;
    a third resistor coupled to drain and gate terminals of the low voltage P-channel JFET;
    a fourth resistor coupled to the drain and source terminals of the second high voltage N-channel depletion-mode transistor; and
    a second capacitor coupled to the drain and source terminals of the second high voltage N-channel depletion-mode transistor.

2. A two terminal high voltage transmit and receive protection switch comprising depletion-mode devices, the depletion-mode devices providing a low noise approximately constant resistance characteristic with zero biasing supplies when small signals are applied; and a voltage detection circuit that turns off the depletion-mode devices and causes the two terminals to have characteristics of a low value constant current source when voltages more positive than approximately 2.0V or more negative than approximately −2.0V are applied to the terminals with respect to each other; wherein the depletion-mode devices comprises: a first high voltage N-channel depletion-mode transistor, a drain terminal of the first high voltage N-channel depletion-mode transistor connected to a first terminal of the two terminal high voltage transmit and receive protection switch, a gate terminal of the first high voltage N-channel depletion-mode transistor connected to the voltage detection circuit; a switch block connected to the source terminal of the first high voltage N-channel depletion-mode transistor; a second high voltage N-channel depletion-mode transistor, a drain terminal of the second high voltage N-channel depletion-mode transistor connected to a second terminal of the two terminal high voltage transmit and receive protection switch, a source terminal of the second high voltage N-channel depletion-mode transistor connected in series with the switch block, a gate terminal of the second high voltage N-channel depletion-mode transistor connected to the voltage detection circuit; wherein the switch block comprises two low voltage depletion-mode P-channel MOSFETs where a source terminal of a first low voltage depletion-mode P-channel MOSFET is connected to a source terminal of the first high voltage N-channel depletion-mode transistor, a drain terminal of the first low voltage depletion-mode P-channel MOSFET connected to a drain terminal of a second low voltage depletion-mode P-channel MOSFET, a source terminal of the second low voltage depletion-mode P-channel MOSFET connected to a source terminal of the second high voltage N-channel depletion-mode transistor, and gate terminals of the first and second low voltage depletion-mode P-channel MOSFET connected to the voltage detection circuit; wherein the voltage detection circuit comprises:

a third high voltage N-channel depletion-mode transistor, a drain terminal of the third high voltage N-channel depletion-mode transistor connected to the drain terminal of the first high voltage N-channel depletion-mode transistor, a gate terminal of the third high voltage N-channel depletion-mode transistor connected to the gate terminal of the first high voltage N-channel depletion-mode transistor and to the drain terminals of the first and second low voltage depletion-mode P-channel MOSFETs;

a first resistor coupled to the gate and source terminals of the third high voltage N-channel depletion-mode transistor and coupled to gate and drain terminals of the first low voltage depletion-mode P-channel MOSFET;

a first Zener diode coupled to the source and gate terminals of the third high voltage N-channel depletion-mode transistor;

a fourth high voltage N-channel depletion-mode transistor, a drain terminal of the fourth high voltage N-channel depletion-mode transistor connected to the drain terminal of the second high voltage N-channel depletion-mode transistor, a gate terminal of the fourth high voltage N-channel depletion-mode transistor connected to the gate terminal of the second high voltage N-channel depletion-mode transistor and to the drain terminals of the first and second low voltage depletion-mode P-channel MOSFETs;

a second resistor coupled to the gate and source terminals of the fourth high voltage N-channel depletion-mode transistor and coupled to gate and drain terminals of the second low voltage depletion-mode P-channel MOSFET;

a second Zener diode coupled the source and gate terminals of the fourth high voltage N-channel depletion-mode transistor.

3. A two terminal high voltage transmit and receive protection switch comprising:

a first high voltage N-channel depletion-mode transistor, a drain terminal of the first high voltage N-channel depletion-mode transistor connected to a first terminal of the two terminal high voltage transmit and receive protection switch;

a switch block connected in series to the source terminal of the first high voltage N-channel depletion-mode transistor;

a second high voltage N-channel depletion-mode transistor, a drain terminal of the second high voltage N-channel depletion-mode transistor connected to a second terminal of the two terminal high voltage transmit and receive protection switch and a source terminal of the second high voltage N-channel depletion-mode transistor connected in series with the switch block;

wherein switch block comprises two low voltage depletion-mode P-channel MOSFETs where a source terminal of a first low voltage depletion-mode P-channel MOSFET is connected to a source terminal of the first high voltage N-channel depletion-mode transistor, a drain terminal of the first low voltage depletion-mode P-channel MOSFET connected to a drain terminal of a second low voltage depletion-mode P-channel MOSFET, a source terminal of the second low voltage depletion-mode P-channel MOSFET connected to a source terminal of the second high voltage N-channel depletion-mode transistor, and gate terminals of the first and second low voltage depletion-mode P-channel MOSFET connected to the voltage detection circuit;

wherein the voltage detection circuit comprises:
a third high voltage N-channel depletion-mode transistor, a drain terminal of the third high voltage N-channel depletion-mode transistor connected to the drain of the first high voltage N-channel depletion-mode transistor;

a first resistor connected to a source terminal of the third high voltage N-channel depletion-mode transistor and to the source terminal of the first low voltage depletion-mode P-channel MOSFET;

a first Zener diode connected to the source terminal of the third high voltage N-channel depletion-mode transistor and to the source terminal of the first low voltage depletion-mode P-channel MOSFET;

a fourth high voltage N-channel depletion-mode transistor, a drain terminal of the fourth high voltage N-channel depletion-mode transistor connected to the drain of the second high voltage N-channel depletion-mode transistor;

a second resistor connected to a source terminal of the fourth high voltage N-channel depletion-mode transistor and to the source terminal of the second low voltage depletion-mode P-channel MOSFET;

a second Zener diode connected to the source terminal of the fourth high voltage N-channel depletion-mode transistor and to the source terminal of the second low voltage depletion-mode P-channel MOSFET.

4. A two terminal high voltage transmit and receive protection switch comprises: a first high voltage N-channel depletion-mode transistor, a drain terminal of the first high voltage N-channel depletion-mode transistor connected to a first terminal of the two terminal high voltage transmit and receive protection switch; a switch block connected in series to the source terminal of the first high voltage N-channel depletion-mode transistor; and a second high voltage N-channel depletion-mode transistor, a drain terminal of the second high voltage N-channel depletion-mode transistor connected to a second terminal of the two terminal high voltage transmit and receive protection switch and a source terminal of the second high voltage N-channel depletion-mode transistor connected in series with the switch block; wherein switch block comprises a low voltage P-channel JFET having a source terminal connected to the source terminal of the first high voltage N-channel depletion-mode transistor, a drain terminal of the P-channel JFET connected to the source terminal of the second high voltage N-channel depletion-mode transistor, and a gate terminal of the P-channel JFET connected to the voltage detection circuit:

a first Zener diode coupled to source and gate terminals of the low voltage P-channel JFET;

a first resistor coupled to source and gate terminals of the low voltage P-channel JFET;

a second resistor connected to the first resistor and to the drain terminal of the first high voltage N-channel depletion-mode transistor;

a first capacitor connected to the first resistor and to the drain terminal of the first high voltage N-channel depletion-mode transistor;

a second Zener diode coupled to drain and gate terminals of the low voltage P-channel JFET;

a third resistor coupled to drain and gate terminals of the low voltage P-channel JFET;

a fourth resistor connected to the third resistor and to the drain terminal of the second high voltage N-channel depletion-mode transistor; and     a second capacitor connected to the fourth resistor and to the drain terminal of the second high voltage N-channel depletion-mode transistor.

5. A two terminal high voltage transmit and receive protection switch comprising a first high voltage N-channel depletion-mode transistor, a drain terminal of the first high voltage N-channel depletion-mode transistor connected to a first terminal of the two terminal high voltage transmit and receive protection switch; a switch block connected in series to the source terminal of the first high voltage N-channel depletion-mode transistor; and a second high voltage N-channel depletion-mode transistor, a drain terminal of the second high voltage N-channel depletion-mode transistor connected to a second terminal of the two terminal high voltage transmit and receive protection switch and a source terminal of the second high voltage N-channel depletion-mode transistor connected in series with the switch block, wherein the voltage detection circuit comprises:

a third high voltage N-channel depletion-mode transistor, a drain terminal of the third high voltage N-channel depletion-mode transistor connected to the drain of the first high voltage N-channel depletion-mode transistor;

a first resistor connected to source and gate terminals of the third high voltage N-channel depletion-mode transistor and to the switch block;

a first Zener diode connected to the source and gate terminals of the third high voltage N-channel depletion-mode transistor and to the switch block;

a fourth high voltage N-channel depletion-mode transistor, a drain terminal of the fourth high voltage N-channel depletion-mode transistor connected to the drain of the second high voltage N-channel depletion-mode transistor;

a second resistor connected to source and gate terminals of the fourth high voltage N-channel depletion-mode transistor and to the switch block; and     a second Zener diode connected to the source and gate terminals of the fourth high voltage N-channel depletion-mode transistor and to the switch block.

6. A two terminal high voltage transmit and receive protection switch comprising a first high voltage N-channel depletion-mode transistor, a drain terminal of the first high voltage N-channel depletion-mode transistor connected to a first terminal of the two terminal high voltage transmit and receive protection switch; a switch block connected in series to the source terminal of the first high voltage N-channel depletion-mode transistor; and a second high voltage N-channel depletion-mode transistor, a drain terminal of the second high voltage N-channel depletion-mode transistor connected to a second terminal of the two terminal high voltage transmit and receive protection switch and a source terminal of the second high voltage N-channel depletion-mode transistor connected in series with the switch block; wherein switch block comprises a low voltage P-channel JFET having a source terminal connected to the source terminal of the first high voltage N-channel depletion-mode transistor, a drain terminal of the P-channel JFET connected to the source terminal of the second high voltage N-channel depletion-mode transistor, and a gate terminal of the P-channel JFET connected to the voltage detection circuit; wherein the voltage detection circuit comprises:

a first Zener diode connected to the switch block;

a first resistor connected to the switch block;

a second resistor connected to the first resistor and to the drain terminal of the first high voltage N-channel depletion-mode transistor;

a first capacitor connected to the first resistor and to the drain terminal of the first high voltage N-channel depletion-mode transistor;

a second Zener diode connected to the switch block;

a third resistor connected to the switch block;

a fourth resistor connected to the third resistor and to the drain terminal of the second high voltage N-channel depletion-mode transistor; and     a second capacitor connected to the fourth resistor and to the drain terminal of the second high voltage N-channel depletion-mode transistor.

\* \* \* \* \*